(12) United States Patent
Yoon

(10) Patent No.: US 6,507,655 B1
(45) Date of Patent: Jan. 14, 2003

(54) EAR MIKE PHONE

(75) Inventor: Duk Chae Yoon, Suwon-si (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/456,276

(22) Filed: Dec. 7, 1999

(30) Foreign Application Priority Data

May 20, 1999 (KR) ............................................. 99-18295
Sep. 17, 1999 (KR) ............................................. 99-39996

(51) Int. Cl.[7] ............................................. H04M 1/00
(52) U.S. Cl. ............................................. 379/430
(58) Field of Search .................... 379/430; 455/568; 381/328, 330

(56) References Cited

U.S. PATENT DOCUMENTS 5,396,030 A * 3/1995 Matsumiya et al. ......... 200/5 A
5,845,197 A * 12/1998 Hada et al. .................. 379/430
6,230,029 B1 * 5/2001 Hahn et al. .................. 379/430

FOREIGN PATENT DOCUMENTS

JP 10164682 6/1998
JP 11-112643 * 4/1999 ................. 379/430

* cited by examiner

*Primary Examiner*—Jack Chiang
(74) *Attorney, Agent, or Firm*—Renner, Otto, Boisselle & Sklar LLP

(57) ABSTRACT

An ear mike phone as a hand-free device is disclosed, in which switches and the like for supplying a power to the mike and the speaker are efficient, and therefore, the driver's driving attention can be prevented from being dissipated. The ear mike phone includes a main body part connected to a mike and a speaker, and connected to a cable to be connected to a hand phone. A switch is installed on an adjustment board of the main body part, for activating the mike and the speaker. A switch control part is provided, with its one side contacting to the switch, and with its another side projecting from a side of the main body part. Upon activation of the switch, the main body part is more firmly settled into the ear, and therefore, the ear mike phone is operated in a sure manner.

12 Claims, 17 Drawing Sheets

EAR MIKE PHONE

BACKGROUND OF THE INVENTION

1. Field of the Invention

The present invention relates to an ear mike phone as a hand-free device, which performs as a mike and a speaker by being connected to a hand phone, so as to contribute to a safe driving during a driving of a car. Particularly the present invention relates to an ear mike phone as a hand-free device, in which switches and the like for supplying a power to the mike and the speaker are efficient, and therefore, the driver's driving attention can be prevented from being dissipated.

2. Description of the prior art

Generally, a car hand phone is fixedly installed within the car by using a support. Or a mike and a speaker are separately installed and connected through lines to the hand phone.

A hand phone apparatus related to this technique is illustrated in FIG. 1. As shown in FIG. 1, ends of a cable 53 are connected to a plug terminal 51 and to a main body part 52, and the cable 53 is connected through a switch 54. The main body part 52 is connected to a connecting rod 55, and the end of the connecting rod 55 is connected to a mike 56. Thus there is formed a mike phone 60 on which a speaker 57 is formed on the main body part 52. The mike phone 60 is inserted into the ear of the user, and therefore, telephone talks can be carried out at a distance from the hand phone.

In the hand phone as described above, the plug terminal 51 which is connected to the cable 53 is connected to the hand phone. Then if the switch 54 of the cable 53 is turned on, the voices from the hand phone are transmitted through the cable 53 to the speaker 57 which is installed on the main body part 52. Under this condition, the voices of the user are transmitted through the mike 56 to the hand phone, so that the other party can hear the user's voices.

The operations of the mike 56 and the speaker 57 of the mike phone 60 are carried out by turning on or off the switch 54 of the cable 53. The user inserts the speaker 57 of the main body part 52 into the ear of the user, and uses it by manipulating the switch 54 of the cable 53.

In the hand phone apparatus as described above, however, the user inserts the speaker 57 into the ear stably, and the switch 54 of the cable 53 is manipulated, thereby activating the mike phone 60. Thus the user's action for groping for the switch 54 and activating the switch 54 is considerably troublesome. During this action, the driver's attention is dissipated, and therefore, an accident might occur.

Further, when manipulating the switch 54, the cable 53 is oscillated, and therefore, the speaker 57 of the main body part 52 which has been stably inserted into the ear may depart and drop from the ear.

Meanwhile, another ear mike phone is disclosed in Japanese Patent Application Laid-open No. Hei-10-164682.

This ear mike phone is illustrated in FIG. 2. As shown in FIG. 2, the earphone-microphone 69 includes: an earphone part 63 to be inserted into an ear; a microphone part 65 connected through a tubular connecting part 64 to the earphone part 63; and a cord 67 extending from the microphone part 65, with a plug 66 being installed to the leading end of the cord 67. The microphone part 65 is facing in the direction of the sound transmitting face of the earphone part 63, and the portion contacting to the cheek is flat.

In this ear mike phone apparatus, the plug 66 of the cord 67 is connected to the hand phone, and the earphone part 63 is stably inserted into the ear, thereby supporting the earphone-microphone 69. Thus the user's voices are transmitted through the microphone part 65 in which the portion contacting to the cheek is flat. Meanwhile, the other party's voices can be heard through the earphone part 63.

However, the earphone-microphone 69 can be activated only by inserting the plug 66 into the hand phone. Therefore, the concentration of the driving attention can be dissipated, and furthermore, the time for inserting the earphone-microphone 69 is considerably long. Therefore, a considerable trouble is encountered in using the earphone-microphone 69.

SUMMARY OF THE INVENTION

The present invention is intended to overcome the above described disadvantages of the conventional techniques.

Therefore it is an object of the present invention to provide an ear mike phone in which an actuation knob for the switch is installed on the main body part so as to make it easy to carry out the switching manipulations, thereby preventing the dispersion of the driving attention, and preventing a possible accident.

It is another object of the present invention to provide an ear mike phone in which the main body part is firmly supported within the ear to prevent a departure of the main body part so as to upgrade the reliability, and the actuation of the switch is done quickly and accurately.

It is still another object of the present invention to provide an ear mike phone in which switching manipulations for connecting and disconnecting the power from the mike and the speaker are eliminated.

In achieving the above objects, the ear mike phone according to the present invention includes: a main body part connected to a mike and a speaker, and connected to a cable to be connected to a hand phone; a switch installed on an adjustment board of the main body part, for activating the mike and the speaker; and a switch control part with its one side contacting to the switch, and with its another side projecting from a side of the main body part.

In another aspect of the present invention, the ear mike phone according to the present invention includes: a main body part connected to a mike, and connected to a cable to be connected to a hand phone; a switch installed on an adjustment board of the main body part, for activating the mike and a speaker; and a switch control part movably inserted into a side of the main body part to secure the speaker (connected to the cable), with its end portion activating the switch during its motion.

In still another aspect of the present invention, the ear mike phone according to the present invention includes: a main body part connected to a mike and a speaker, and connected to a cable to be connected to a hand phone; a plurality of contact electrodes installed in the main body part, for activating the mike and the speaker; and a switch control part with the speaker installed thereon (the speaker being connected to the cable), being elastically supported by being inserted around the speaker in a plural number, and its inserting ends being connected to the contact electrodes.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENTS

Figure 1:
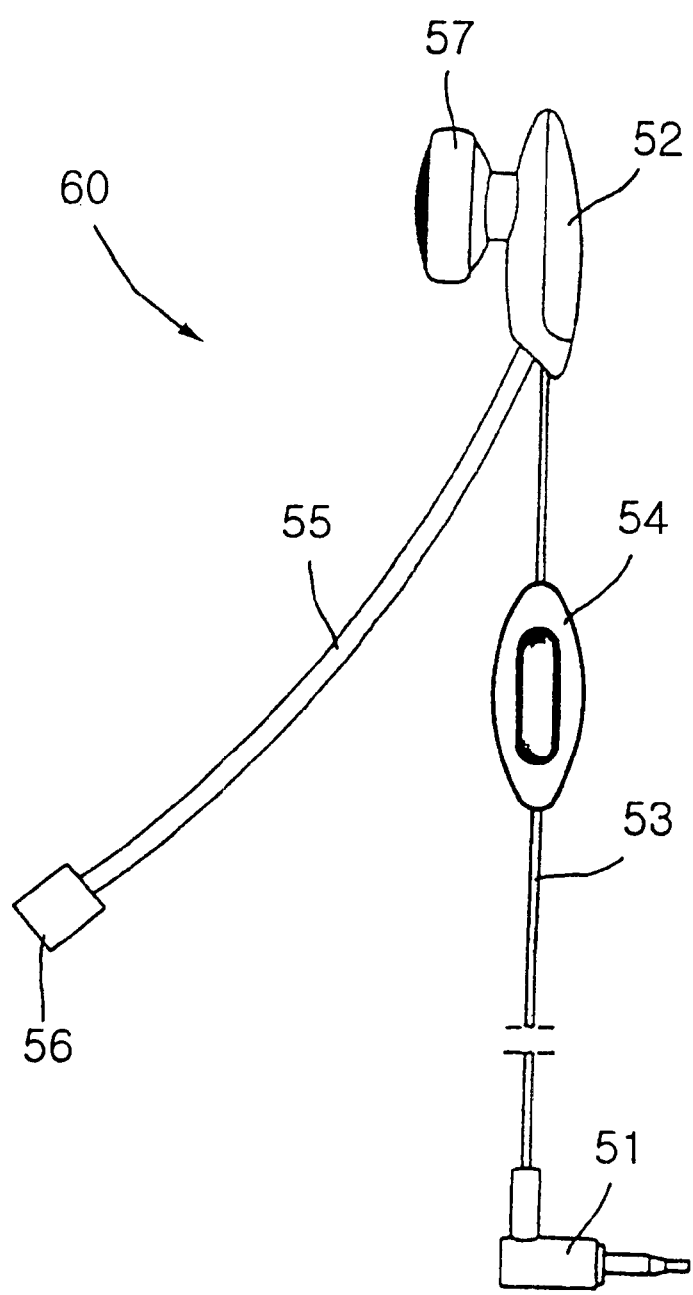
FIG. 1 illustrates the general ear mike phone for a hand phone.
Figure 2:
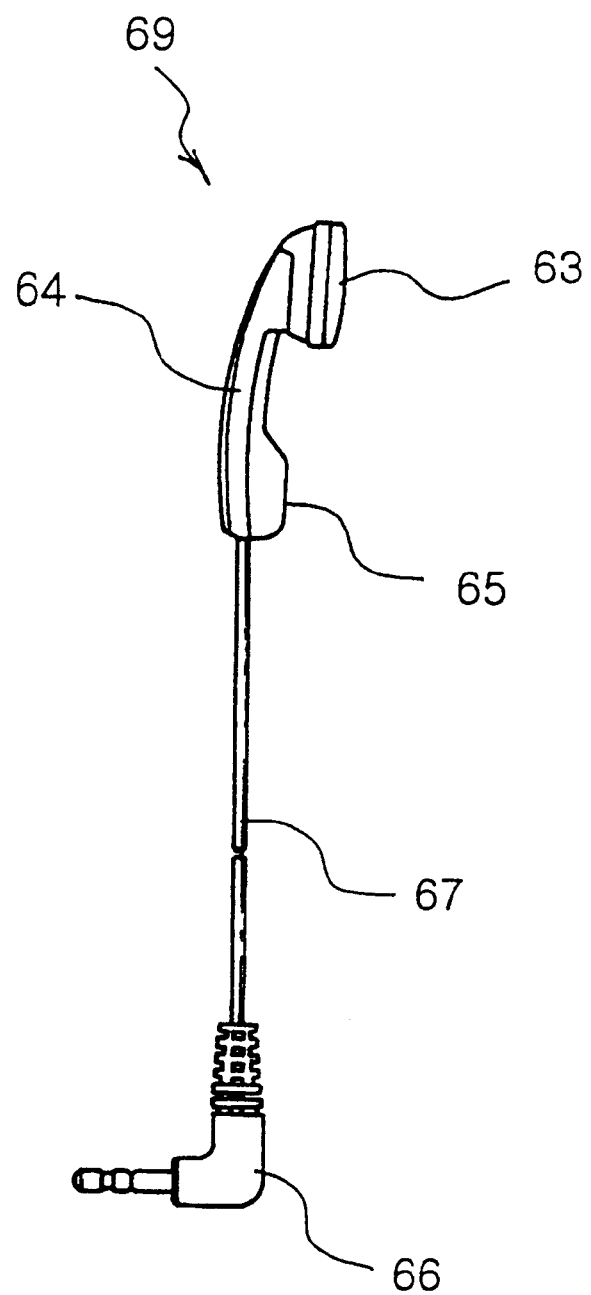
FIG. 2 schematically illustrates the conventional earphone-microphone.

As shown in FIGS. 3 to 5, the ear mike phone 130 according to the present invention includes: a cable 102 connected to a plug terminal 101 for being inserted into a hand phone to be electrically connected to it; a main body part 105 electrically connected to the cable 102 and connected through a connecting rod 103 to a mike 104; and a speaker 106 projecting from the main body part 105.

Meanwhile, in the mike phone 130 constituted as described above, if the plug terminal 101 is connected into the hand phone, phone talks are possible even at a distance from the hand phone (not illustrated), owing to the existence of the speaker 106 and the mike 104.

Figure 3A:
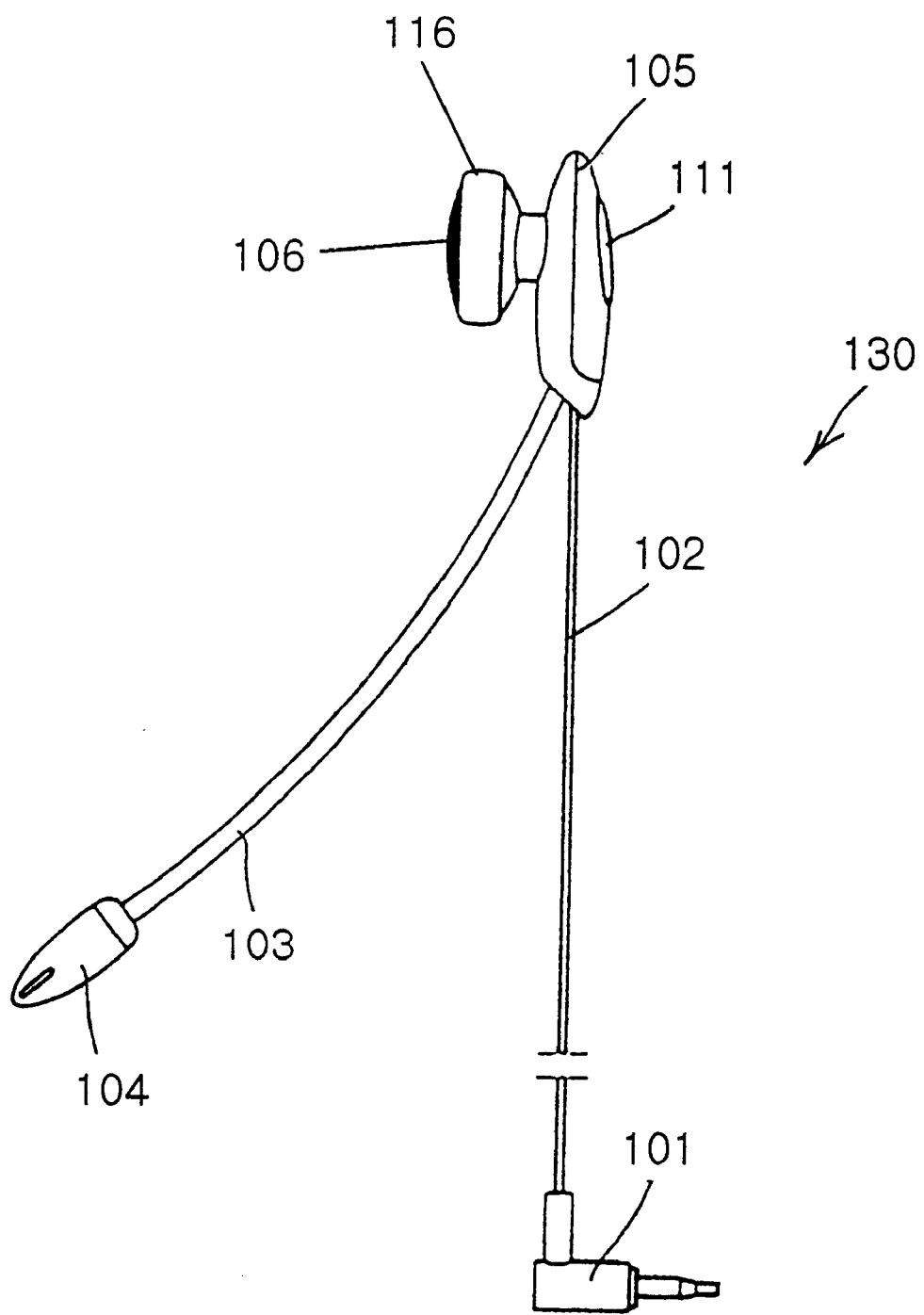
FIG. 3A schematically illustrates the ear mike phone for a hand phone according to the present invention.
Figure 3B:
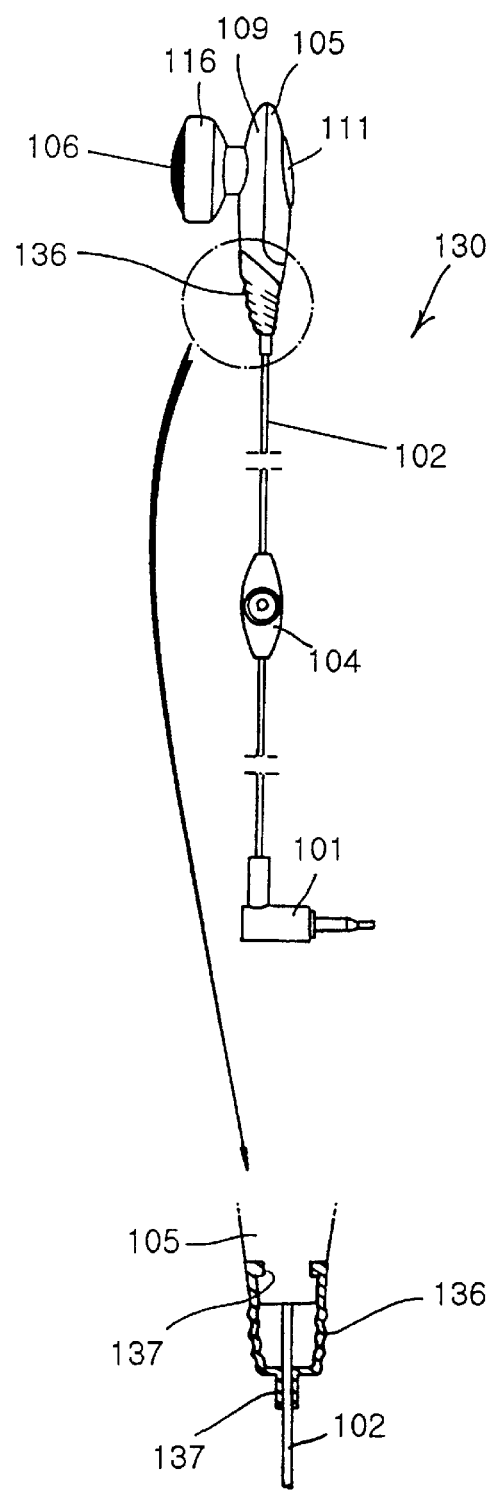
FIG. 3B schematically illustrates another embodiment of the ear mike phone for a hand phone according to the present invention.
Figure 4A:
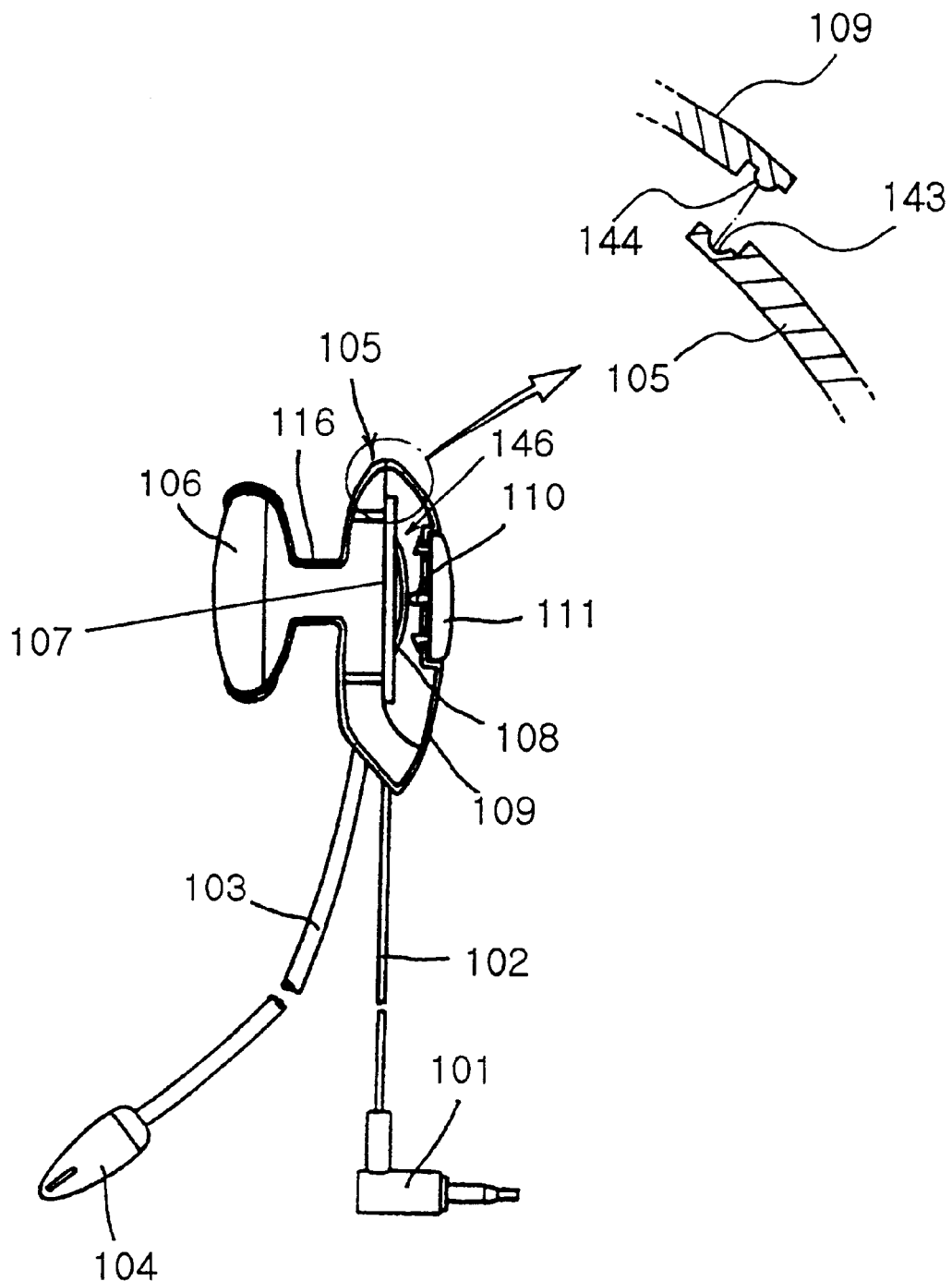
FIGS. 4A and 4B are schematic sectional views showing the ear mike phone according to the present invention.
Figure 4B:
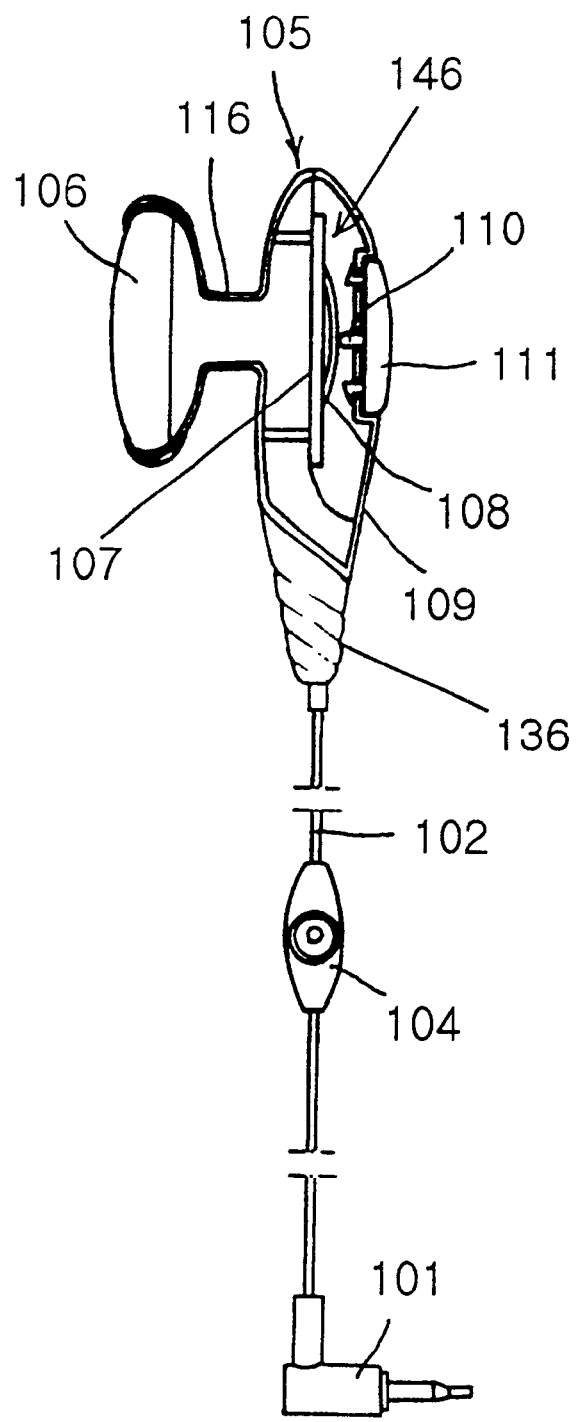
Figure 5A:
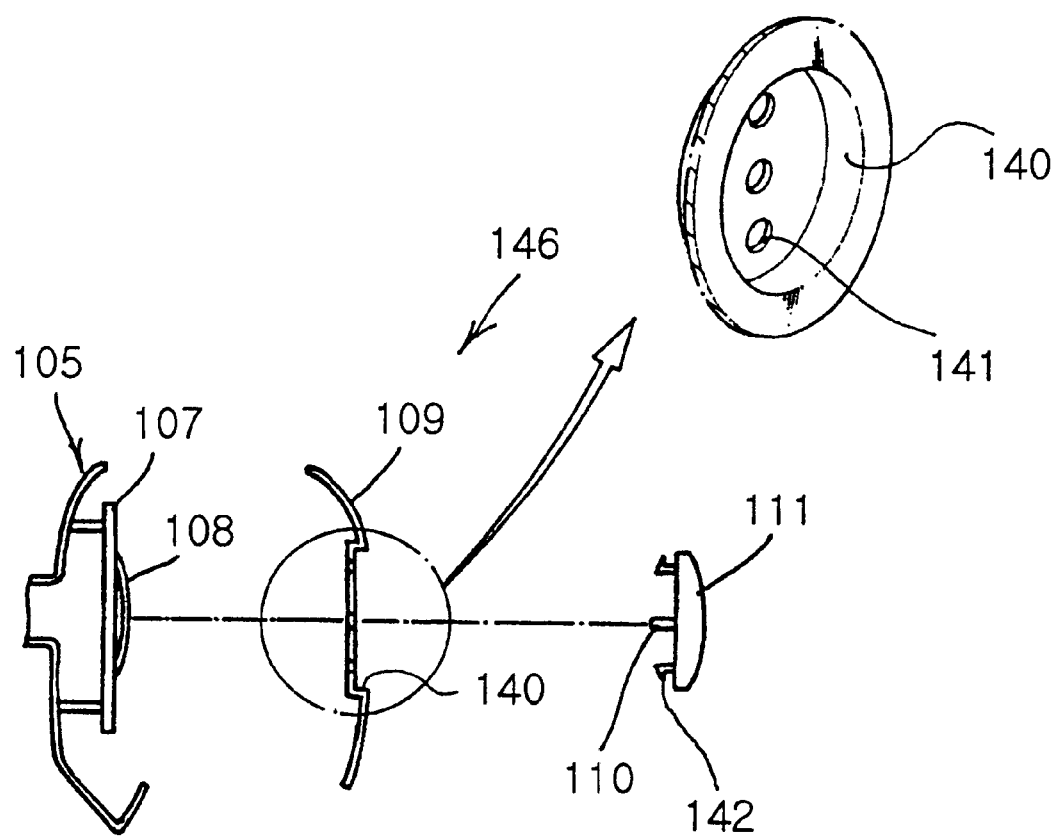
FIGS. 5A, 5B and 5C are sectional views showing the actuation knob for the ear mike phone according to the present invention.
Figure 5B:
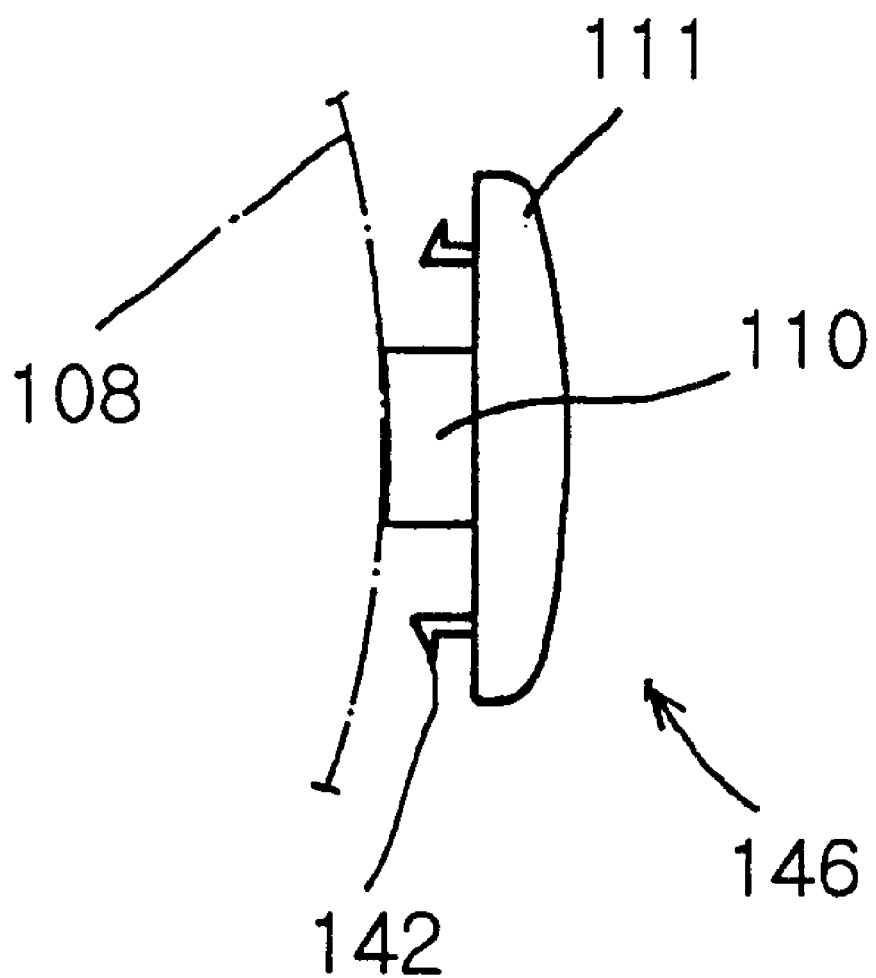
Figure 5C:
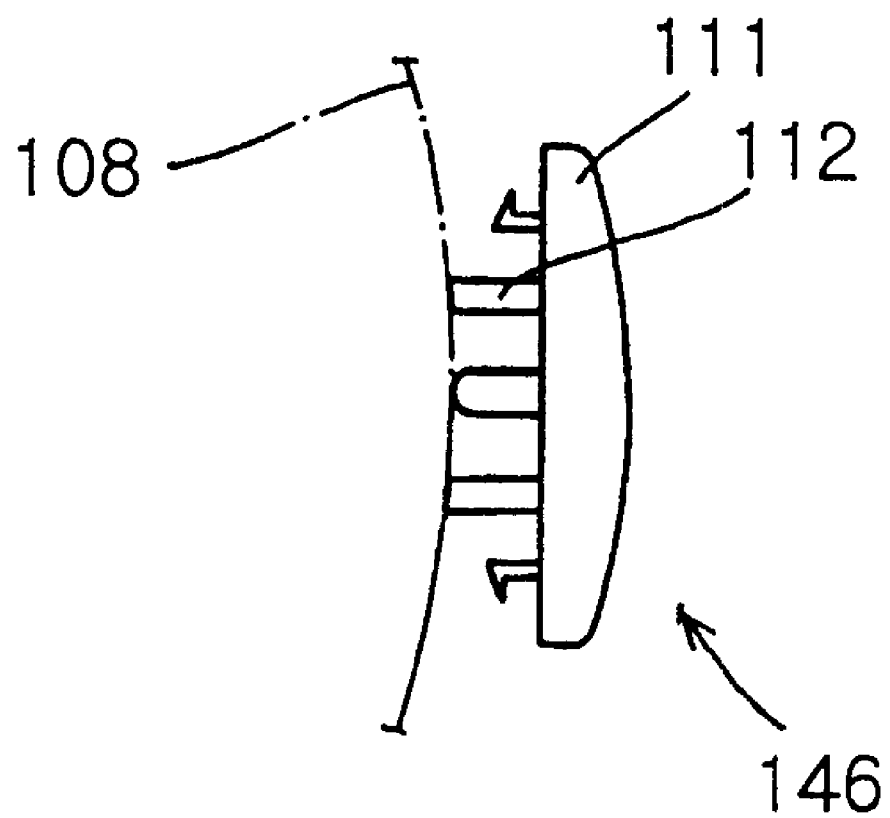

FIG. 3A schematically illustrates the ear mike phone for a hand phone according to the present invention. FIG. 3B schematically illustrates another embodiment of the ear mike phone for a hand phone according to the present invention. FIGS. 4A and 4B are schematic sectional views showing the ear mike phone according to the present invention. FIGS. 5A, 5B and 5C are sectional views showing the actuation knob for the ear mike phone according to the present invention.

An adjustment board 107 is fixed on the inside of the main body part 105 by means of screws (not illustrated) or the like, in such a manner that the adjustment board 107 should be electrically connected to the plug terminal 101. On the adjustment board 107, there is installed a switch 108, such as the illustrated membrane type switch, for controlling the operations of the speaker 106 and the mike 104. The switch 108 is installed on the adjustment board 107 to actuate the speaker 106 and the mike 104.

Further, on a side of the main body part 105, there is formed a recess 143 for being mated with a supporting step 144 of a securing cover 109 so as to be secured to the main body part 106.

As shown in FIGS. 4A, 4B, 5A, 5B and 5C, an actuation knob 111 is inserted into the securing cover 109, and a contact part 110, such as the illustrated contact protuberance, of the actuation knob 111 is protruded such that the actuation knob 111 is closely contacted to the switch 108. The switch is installed on the adjustment board 107 for abutting engagement by the contact protuberance 110 of the actuation knob 111 to actuate the speaker 106 and the mike 104, and the actuation knob 111 is in substantial coaxial alignment with the speaker 106. As will be appreciated by one of ordinary skill in the art, with such an arrangement the user can easily perceive the location of the switch, as it is aligned with the user's ear, and thus gain quick access to the switch. Further, the contact protuberance 110 closely contacts to the face of the switch 108.

As shown in FIGS. 5A and 5B, the securing cover 109 has a plurality of knob securing holes 140 to receive the contact protuberances 110. Or as shown in FIG. 5C, the actuation knob 111 has one or more contact points 112 to be inserted.

Further, as shown in FIGS. 3A, 3B, 4A and 4B, the mike 104 which is connected to the main body part 105 is either connected to the cable 102, or is connected to an end of the connecting rod 103.

As shown in FIGS. 3B and 4B, owing to the action of the contacted part 137, a cable securing device 136 which is shaped like a bellows is disposed to connect the cable 102 to the main body part 105.

Now the first embodiment of the present invention constituted as above will be described as to its action and effects.

As shown in FIGS. 3 to 5, the speaker 106 is installed within a case 116, such as the illustrated speaker body, which projects from a side of the main body part 105. Thus the speaker 106 releases the voices of the other party by being connected to the hand phone.

Further, the mike 104 which is connected to the bottom of the main body part 105 is either connected to the end of the connecting rod 103, or connected between segments of the cable 102 below the main body part 105. When inserting the speaker body 116 into the ear of the user, the mike 104 which is either connected to the end of the connecting rod 103 or connected between the segments of the cable 102 is made to be disposed near the mouth of the user.

Further, as shown in FIGS. 3B and 4B, the cable securing device 136 is firmly connected to the cable 102, and the mike 104 is connected between the cable segments. Thus during the operation of the mike 104, the movements of the cable 102 is minimized. Further, a short-circuiting of the cable 102 due to the fatigue of the cable connecting part between the cable 102 and the main body part 105 is prevented. Further, owing to the action of the bellows, the cable 102 which is supported by the cable securing device 136 easily moves.

Under this condition, the cable securing device 136 is fixed to a contacted part 137 which is disposed between the lower end of the cable securing device 136 and the upper end of the cable 102, so as to prevent any dislocation of the cable 102 during the motion of the cable 102.

Further, the adjustment board 107 is secured within the main body part by means of screws (not illustrated), and thereupon, a membrane type switch 108 is installed. The switch 108 is electrically connected to the mike 104 and the speaker 106, and like in the general switches, the switching of the power can be carried out by sequential pressing of the switch 108.

Thus when the switch 108 is pressed, the mike 104 and the speaker 106 can be activated. That is, the sounds are transmitted from the mike 104 through the hand phone to the other party, or the voices of the other party are received from the hand phone through the speaker 106 of the ear mike phone.

By a single pressing of the switch 108, the electric circuit is connected, and by another pressing of the switch 108, the electric circuit (the circuit connecting the speaker 106 and the mike 104) is disconnected.

Further, as shown in FIGS. 3 to 5, the actuation knob 111 for activating the switch 108 is installed on a side of the securing cover 109, with one end of 10 the actuation knob 111 being contacted to a side of the switch 108. The securing cover 109 is elastically supported by the main body part 105 by fitting the supporting step 144 of the securing cover into the recess 143 of the main body part 105.

As shown in FIG. 5A, a knob securing holes 140 are formed on the securing cover 109, so that engaging pieces 142 of the actuation knob 111 can be inserted into the securing holes 141.

As shown in FIGS. 4 and 5, a contact protuberance 110 is formed on the bottom of the actuation knob 111. Thus when the securing cover 109 is fitted to the main body part 105, the contact protuberance 110 contacts to the top of the switch 108. This contact protuberance 110 moves up and down together with the switch 108 in contact with the switch 108.

Further, when the securing cover 109 is fitted to the main body part 105 through the recess 143 and the supporting step 144, the actuation knob 111 protrudes to the outside of the securing cover 109.

Owing to the actuation knob 111 which protrudes to the outside of the securing cover 109, the insertion of the main body part 105 into the ear and the switching actuation are simultaneously carried out, with the main body part 105 being firmly supported. Further, the speaker 106 and the mike 104 are activated together with the hand phone, so that the transmission and reception of the voices can be simultaneously carried out.

As shown in FIGS. 5A and 5B, the contact protuberance 110 of the actuation knob 111 contacts to the top of the switch 108 in the form of a point contact or in the form of an area contact. Thus when the actuation knob 111 is pressed to activate the switch 108, the pressing force is wholly transmitted to the switch 108.

Alternatively, as shown in FIG. 5C, the actuation knob 111 is provided with a plurality of contact points 112, and therefore, even if the user presses any part of the actuation knob 111, the switch 108 is activated quickly and accurately.

Thus, the switch 108 is activated in a perfect manner by pressing the actuation knob 111 which projects from the main body part 105. Further, the main body part 105 is firmly secured during the pressing of the actuation knob 111, with the result that the main body part 105 is prevented from being detached from the ear during the operation of the ear mike phone 130.

FIGS. 6 and 7 schematically illustrate another embodiment of the ear mike phone of the present invention. In this embodiment, the ear mike phone 230 includes: a cable 202 connected to a plug terminal 201 for being inserted into a hand phone to be electrically connected to it; a main body part 205 electrically connected to the cable 202 and connected through a connecting rod 203 to a mike 204; and a speaker 206 projecting above the main body part 205.

A speaker 206 is installed laterally movably on the main body part 205 of the ear mike phone 230. The switch 12 control part 247 is inserted into a speaker insertion hole 214 which is formed on a side of the main body part 205. A guide boss 213 projects from an edge of the speaker insertion hole 214, and one or more guide grooves 231 are formed at a side of the guide boss 213.

A speaker body 216 is press-inserted into the speaker insertion hole 214, and the speaker body 216 is provided with one or more supporting projections 215 correspondingly with the guide grooves 231. Further, a concave contact plate 217 is installed on the bottom of the speaker body 216, so as to make the plate 217 contact to the switch 208.

Figure 6A:
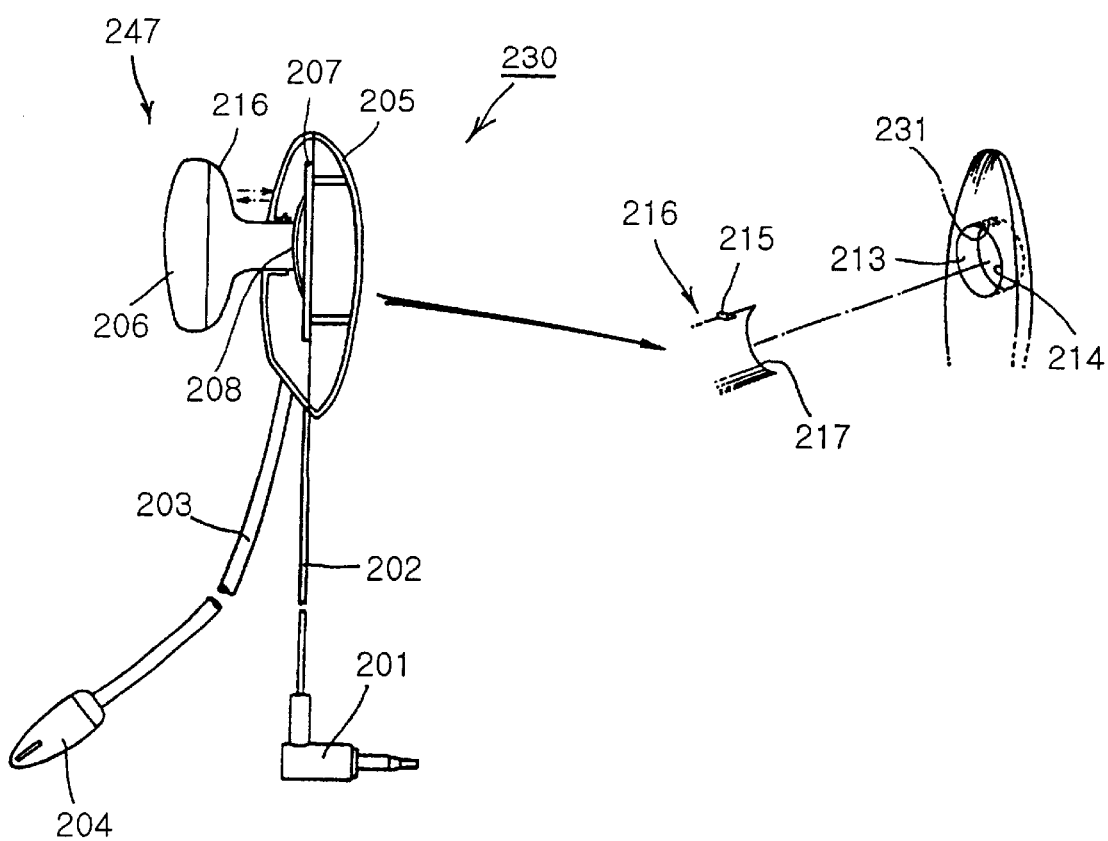
FIGS. 6A, 6B, 7A and 7B schematically illustrate still another embodiment of the ear mike phone according to the present invention.
Figure 6B:
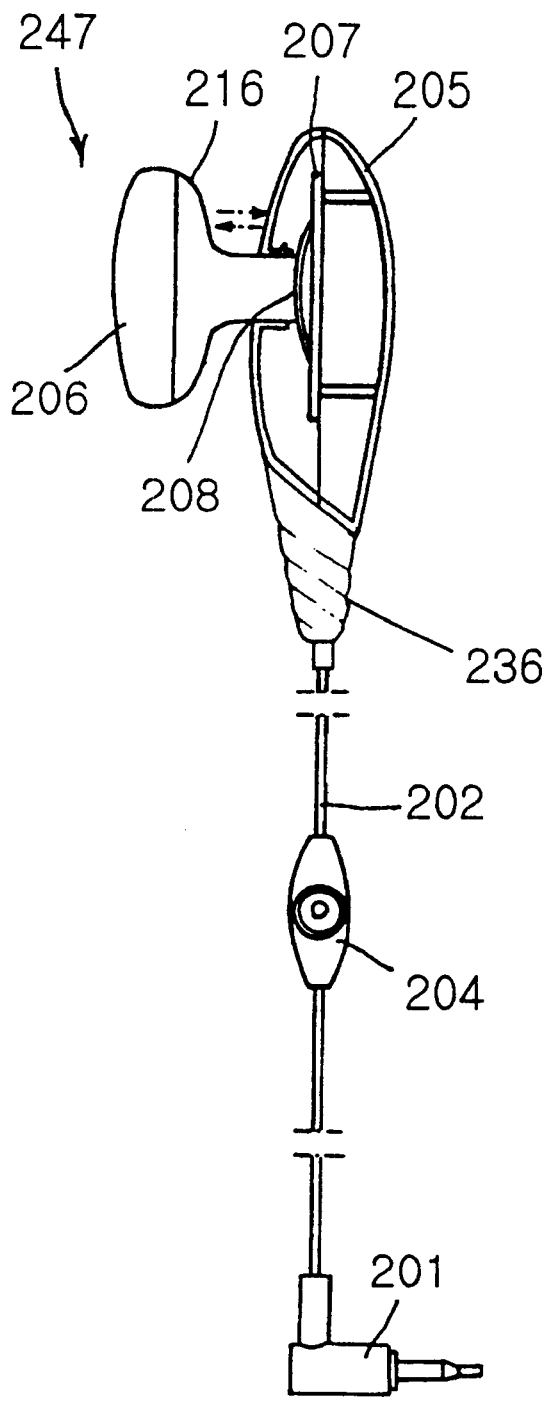

Further, as shown in FIGS. 6A and 6B, the mike 204 which is connected to the main body part 205 is connected either between segments of the cable 202, or is connected to the end of the connecting rod 203 which is connected to a side of the cable 202.

As shown in FIG. 6B, a cable securing device 236 is connected between the lower end of the main body part 205 and the upper end of the cable 202.

Figure 7A:
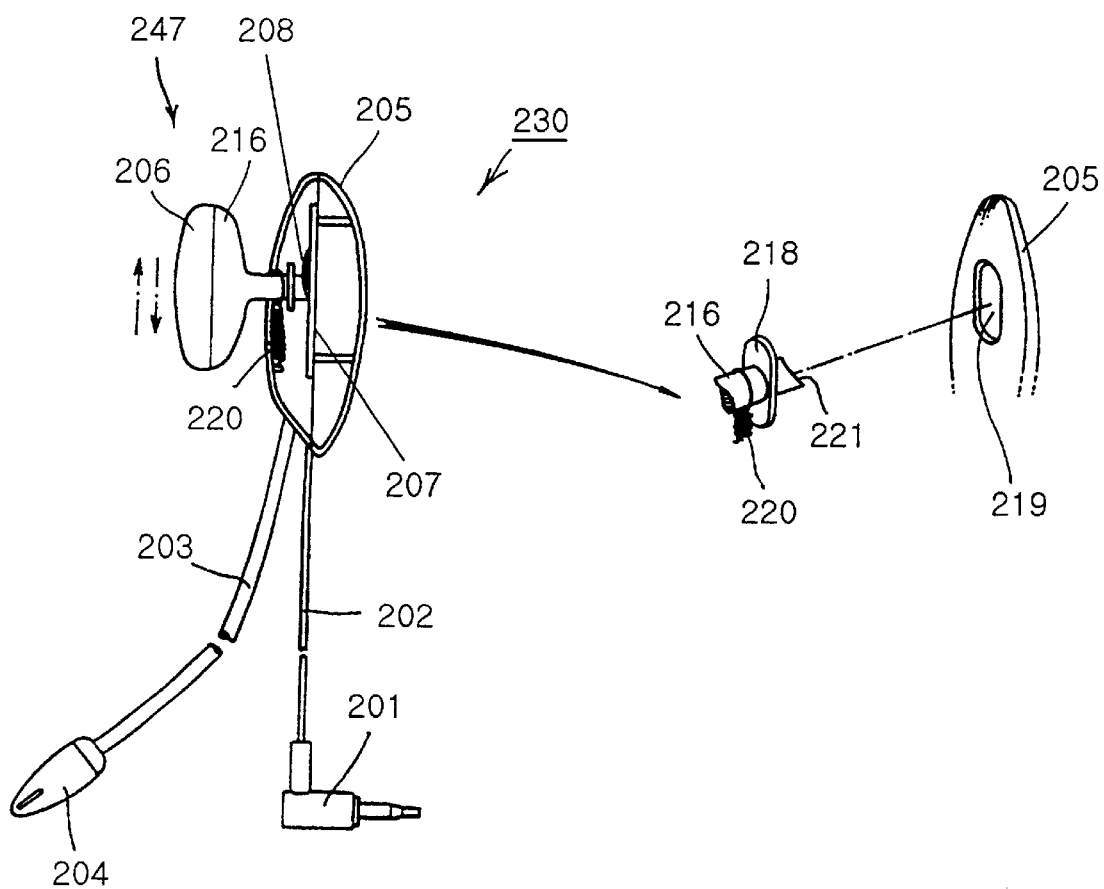
Figure 7B:
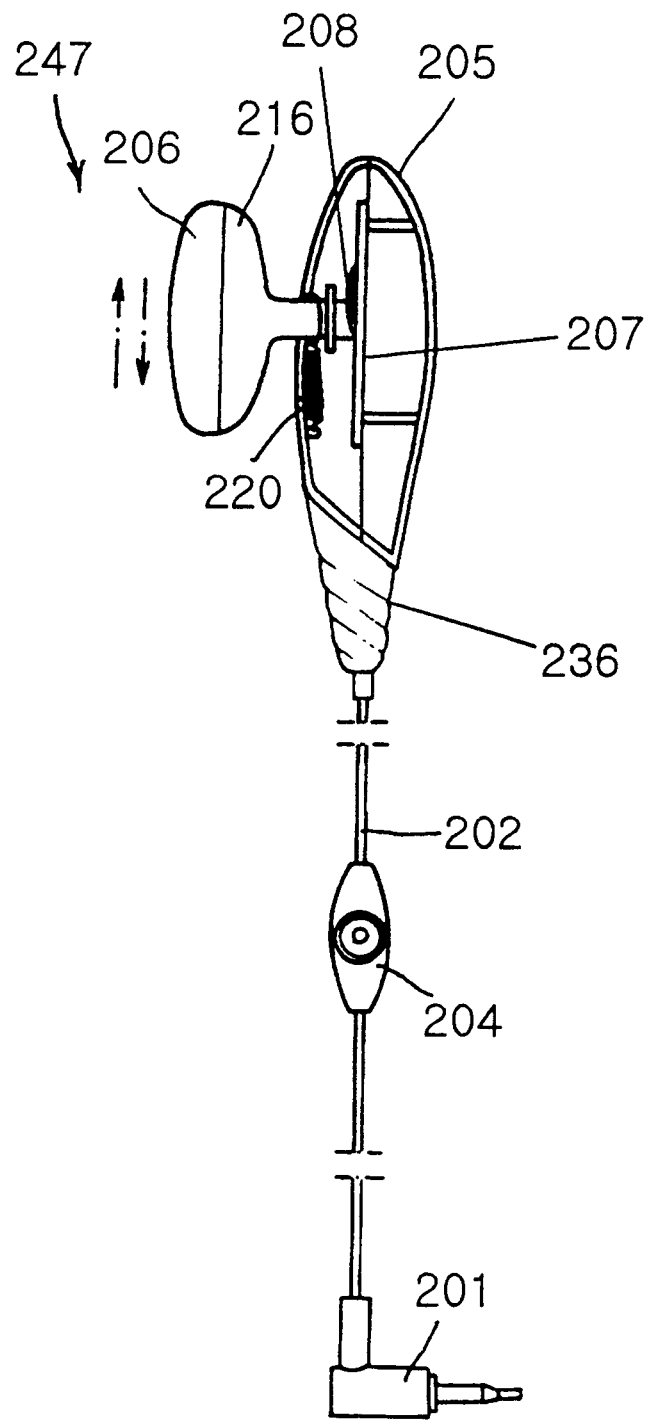

Alternatively as shown in FIGS. 7A and 7B, the switch control part 247 is installed on the main body part 205 vertically movably. A vertically elongate insertion hole 219 is formed in the main body part 205, and a speaker body 216 having a securing plate 218 is inserted into the insertion hole 219. Between the securing plate 218 and the main body part 205, there is installed a speaker moving spring 220.

Further, on the bottom of the securing plate 218, there is installed a contact plate 221 for being contacted with the switch 208. When the contact plate 221 moves upward (or when the main body part 205 moves downward), the switch 208 is contacted. For this purpose, the switch 208 is installed upon an adjustment board 207 of the main body part 205.

Further, the mike 204 which is connected to the main body part 205 is either connected between segments of the cable 202, or is connected to the end of a connecting rod 203 which is connected to a side of the cable 202.

Further as shown in FIG. 7B, a cable securing device 236 is connected between the lower end of the main body part 205 and the upper end of the cable 202.

Now this second embodiment of the present invention will be described as to its action and effects.

As shown in FIGS. 6A and 6B, the speaker 206 is movably secured on a side of the main body part 205. The speaker insertion hole 214 with a guide boss 213 projecting therefrom is formed on the main body part 205. When the speaker body 216 is inserted into the insertion hole 214, the speaker body 216 is supported by the guide boss 213, and therefore, the speaker body 216 is prevented from being moved within the speaker insertion hole 214.

The speaker body 216 which is movable in the lateral direction on the main body part 205 is integrally formed with the speaker 206. When the speaker body 216 with the supporting projection 215 is press-inserted into the speaker insertion hole 214, the supporting projection 215 is engaged with the guide groove 231 which is formed at a side of the guide boss 213. In this manner, when inserting the speaker body 216, the height of the speaker 206 is adjusted.

The guide groove 231 which adjusts the insertion amount of the speaker body 216 has a length as large as the up and down movements of the switch 208, such as the illustrated membrane type switch, so that the membrane type switch 208 can move as much as required during its actuation.

The speaker body 216 within which the speaker 206 is installed has an arcuate contact plate 217 on its tip. Thus when the supporting projection 215 of the speaker body 216 is secured into the guide groove 231, the speaker body 216 is contacted to the top of the switch 208 of the adjustment board 207 which is installed within the main body part 205.

Under this condition, the bottom of the speaker body 216 continuously contacts to the top of the switch 208, and thus, the up and down movements of the switch 208 can be carried out.

If the speaker body 216 with its bottom contacted to the switch 208 is inserted into the ear, then at the same time, the speaker moves back so as for the contact plate 217 to activate the switch 208. As a result, the speaker 206 and the mike 204 of the ear mike phone 230, which are electrically connected to the switch 208, are activated.

Further, as shown in FIG. 6B, a short-circuiting of the cable 202 due to the fatigue of the cable connecting part between the cable 202 and the main body part 205 is prevented. Further, owing to the action of the bellows, the cable 202 which is supported by the cable securing device 236 easily moves.

Alternatively as shown in FIGS. 7A and 7B, the speaker 206 is installed on the main body part 205 vertically movably. A vertically elongate insertion hole 219 is formed in the main body part 205, and a speaker body 216 having a securing plate 218 is inserted into the insertion hole 219. Thus the securing plate 218 is rotated after the insertion, and therefore, the speaker body 216 is prevented from being detached from the main body part 205.

Between the securing plate 218 and the main body part 205, there is installed a speaker moving spring 220. Thus when raising the speaker body 216 along the vertically elongate insertion hole 219, if the external force is withheld, then the speaker body 216 is restored to the original position owing to the elastic force of the spring 220, that is, is positioned to a side of the elongate insertion hole 219.

Further, on the bottom of the securing plate 218, there is installed a contact plate 221 for being contacted with the switch 208. When the speaker body 216 moves along the elongate insertion hole 219, the contact plate 221 presses the switch 208 to activate the switch 208.

Under this condition, when the contact plate 221 moves along the elongate insertion hole 219 to reach an end of the elongate insertion hole 219, the switch 208 which is installed on the adjustment board 207 of the main body part 205 is activated by the pressing force of the contact plate 221. For this purpose, the switch 208 is disposed upon the adjustment board 207 of the main body part 205.

Accordingly, if the speaker body 216 is inserted into the ear of the user, and is pulled down, the contact plate 221 activates the switch 208, with the result that the speaker 206 and the mike 204 of the ear mike phone 230 operate, in a sate with the ear mike phone 230 being connected to the hand phone.

Thus if the case 216 (which is movable in the lateral and lengthwise direction of the main body part 205) is inserted into ear and is moved, then the switch 208 is activated, so that the ear mike phone 230 can be easily made to operate.

Further as shown in FIG. 7B, a cable securing device 236 is connected between the lower end of the main body part 205 and the upper end of the cable 202. Thus during the operation of the mike 204 which is connected between segments of the cable 202, the movements of the cable 202 is minimized. Further, a short-circuiting of the cable 202 due to the fatigue of the cable connecting part between the cable 202 and the main body part 205 is prevented. Further, owing to the action of the bellows, the cable 202 which is supported by the cable securing device 236 easily moves.

Figure 8A:
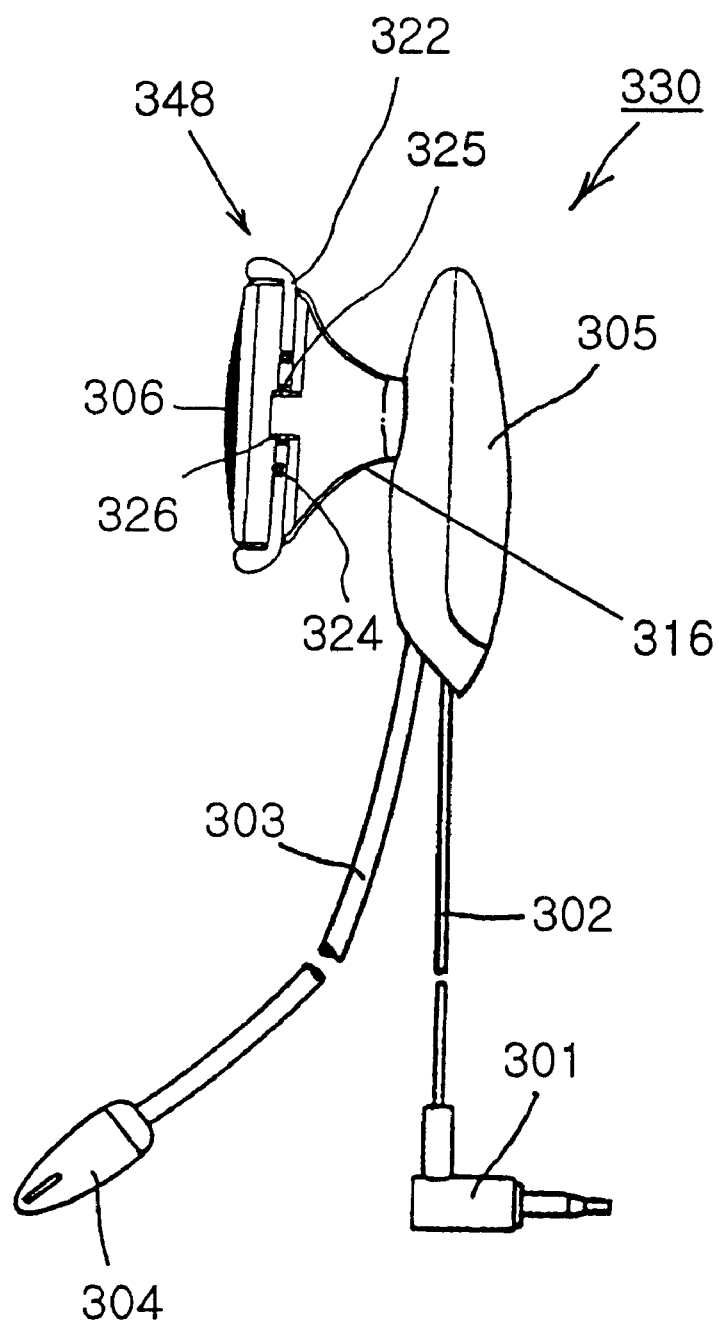
FIGS. 8A and 8B are sectional views showing still another embodiment of the ear mike phone according to the present invention.
Figure 8B:
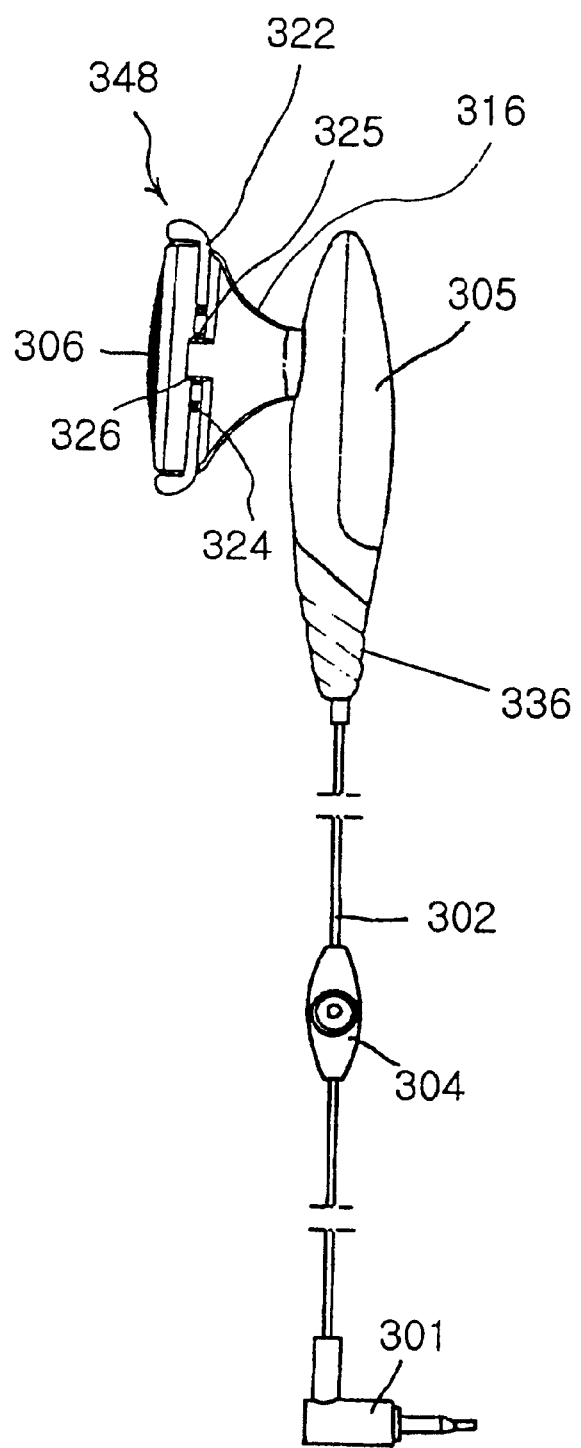
Figure 9:
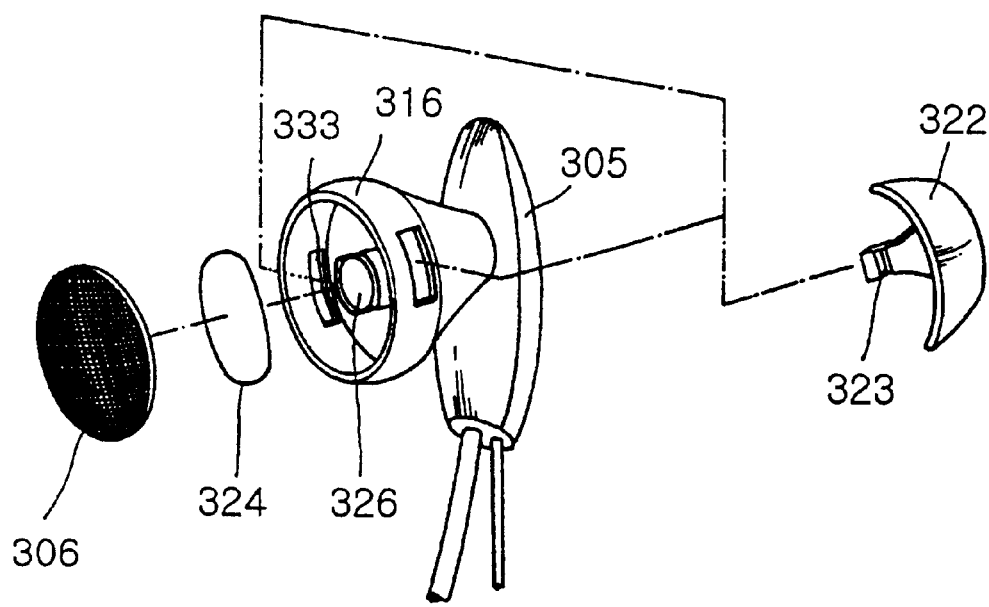
FIG. 9 illustrates a critical portion showing the contact state of the electrodes of FIG. 8.

FIGS. 8A and 8B are sectional and exploded perspective views showing still another embodiment of the present invention. FIG. 9 illustrates a critical portion showing the contact relation of the electrode of FIG. 8. In this third embodiment, the ear mike phone 330 includes: a cable 302 connected to a plug terminal 301 for being inserted into a hand phone to be electrically connected to it; a main body part 305 electrically connected to the cable 302 and connected through a connecting rod 303 to a mike 304; and a speaker 306 projecting from a side of the main body part 305.

A switch control part 348 is installed in a speaker body 316 which is coupled to the main body part 305. Contact plate insertion slots 333 are formed on the speaker body 316 which is coupled to the main body part 305. A pair of sector shaped contact plates 322 each of which has an inwardly narrowing shape are inserted into the insertion slots 333 to be elastically supported therein.

Further, a securing recess 323 is formed on the contact plate 322 to receive a contact plate fixing spring 324. A switch plate 325 is elastically installed on the inner end of each of the contact plates 322. Further, a pair of contact electrodes 326 which are connected to the cable 302 are attached to around an electrode plate 327 which projects from the inside of the main body part 305, the contact electrodes 326 being contacted with the switch plates 325.

The mike 304 is connected to the main body part 305, and is connected through the contact electrode 326 to the cable 302. The mike 304 is either connected between segments of the cable 302, or is connected to the end of a connecting rod 303 which is connected to a side of the cable 302.

As shown in FIG. 8B, a cable securing device 336 is connected between the lower end of the main body part 305 and the upper end of the cable 302.

Now this third embodiment of the present invention constituted as above will be described as to its action and effects.

Figure 10:
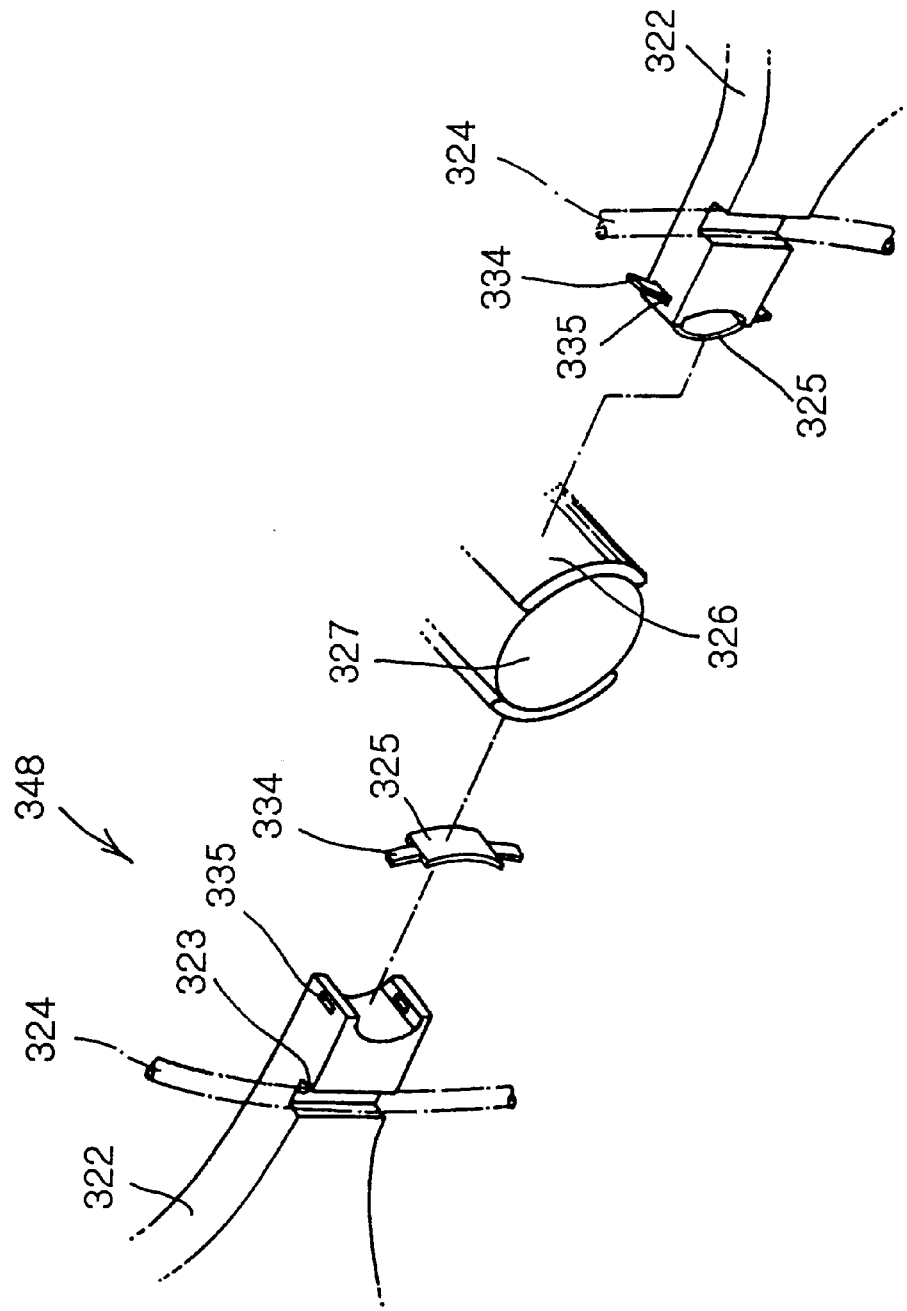
FIG. 10 is an exploded perspective view showing the contact state of the electrodes of FIG. 8.

As shown in FIGS. 8 to 10, the case 316 is coupled to the main body part 305. A pair of the contact plate insertion slots 333 are formed on the circumference of the speaker body 316, and a pair of contact plates 322 which are sector-shaped with their inner ends narrowing are inserted into the contact plate insertion slots 333.

Under this condition, a securing recess 323 is formed on the contact plate 322 to receive a contact plate fixing spring 324, the contact plate 322 being movably inserted into the contact plate insertion slot 333 of the speaker body 316. Therefore, the contact plates 322 are always forced outward from the speaker body 316.

Further, as shown in FIGS. 8A and 8B, if the speaker body 316 with the speaker 306 installed therein is inserted into the ear of the user, then the contact plates 322 are pressed inward owing to the contact plate fixing springs 324, while if the speaker body 316 is taken out of the ear, then the contact plates 322 are spread out of the speaker body 316 by the same action of the springs 324.

Therefore, owing to the contact plates 322 which are always forced outward from the speaker 306, the speaker body 316 is securely placed within the ear. Accordingly, even under some external interference, the speaker body 316 is prevented from being detached from the ear.

Further, as shown in FIGS. 9 and 10, if the contact plates 322 are pressed inward, then the contact switches 325 of the contact plates 322 are contacted to the contact electrodes 326 which surround the electrode plate 327.

Under this condition, the speaker 306 and the mike 304 which are electrically connected to the contact electrodes 326 are made to operate owing to the actuation of the switch plates 325 which are connected to the contact electrodes 326.

In this manner, even without a separate power supplying/withholding component, the speaker 306 and the mike 304 can be easily activated and deactivated only by inserting and detaching the speaker body 316 to and from the ear.

Further, as shown in FIG. 8B, the mike 304 is connected between the segments of the cable 302, and a cable securing device 336 is used. In this case, a short-circuiting of the cable 302 due to the fatigue of the cable connecting part between the cable 302 and the main body part 305 is prevented. Further, owing to the action of the bellows, the cable 302 which is supported by the cable securing device 336 easily moves.

The contact switches 325 are respectively installed on the insides of the contact plates 322, and have an arcuate shape. Further, securing protuberances 334 are integrally formed on both ends of the switch plate 325. The securing protuberances 334 are inserted into supporting slots 335, and therefore, when the contact plates 322 are moved, the switch plates 325 are firmly contacted to the contact electrodes 326.

Under this condition, the arcuate switch plates 325 easily angularly move around the contact electrodes 326, in a state with the integral securing protuberances 334 being inserted into the supporting slots 335.

Further, when the switch plates 325 are contacted to the contact electrodes 326, the arcuate switch plates 325 are spread, and therefore, the contacts between the switch plates 325 and the contact electrodes 326 become secure.

In this manner, even without a separate power supplying/withholding component, the speaker 306 and the mike 304 can be easily activated and deactivated only by inserting and withdrawing the speaker body 316 to and from the ear, owing to the switch plates 325 of the contact plates 322.

According to the present invention as described above, the switch is installed on the adjustment board for abutting engagement by the contact part of the actuation knob to actuate the speaker and the mike, and the knob is in substantial coaxial alignment with the speaker. As will be appreciated by one of ordinary skill in the art, with such an arrangement the user can easily perceive the location of the switch, as it is aligned with the user's ear, and thus gain quick access to the switch. Therefore, the driving attention of the driver can be prevented from being dissipated. Further, during the switching actuation, the speaker is more firmly inserted into ear, and therefore, the ear mike phone is prevented from being detached from the ear.

Further, one or more contact protuberances are provided, so that the contacting actuation of the switch can be carried out quickly and in a sure manner.

Further, the power is turned off by the switch upon detaching the speaker from the ear, and therefore, a separate power switching device is not required. Thus the ear mike phone can be used in a convenient manner.

In the above, the present invention was described based on the specific preferred embodiments and the drawings, but it should be apparent to those ordinarily skilled in the art that various changes and modifications can be added without departing from the spirit and scope of the present invention which will be defined in the appended claims.

What is claimed is:

1. An ear mike phone for connection to a mobile communication device for communication, comprising:
   a main body part having an adjustment board installed on a side of the main body part;
   a speaker fixed in a case protruding from said main body part to reproduce a receiving voice;
   a mike connected to said main body part to receive a transmitting voice;
   an actuation knob including a contact part and arranged with respect to a securing cover with one side of the actuation knob exposed for actuation by a user;
   a plug terminal, connected to the adjustment board through a cable, for connecting the ear mike phone to the mobile communication device; and
   a switch installed on the adjustment board for abutting engagement by the contact part of the actuation knob to actuate the speaker and the mike, and
   said knob being in substantial coaxial alignment with said speaker.

2. The ear mike phone as claimed in claim 1, wherein said securing cover has a knob receiving recess.

3. The ear mike phone as claimed in claim 2, wherein said actuation knob has engaging pieces inserted into securing holes in said securing cover.

4. The ear mike phone as claimed in claim 2, wherein on a side of said main body part, there is formed a recess for being engaged with a supporting step of a securing cover so as to be secured to said main body part.

5. The ear mike phone as claimed in claim 1, wherein said actuation knob has one or more contact points to be contacted to a top of said switch.

6. The ear mike phone as claimed in claim 1, wherein said contact part is contacted to the top of said switch.

7. The ear mike phone as claimed in claim 6, wherein said contact part is formed on a bottom of said actuation knob and point-contacts to an uppermost side portion of said switch.

8. The ear mike phone as claimed in claim 6, wherein said contact part is formed on the bottom of said actuation knob and point-contacts to an uppermost top portion of said switch.

9. The ear mike phone as claimed in claim 1, wherein said switch is of a membrane type.

10. The ear mike phone as claimed in claim 1, wherein said mike is connected between segments of said cable, said cable being connected to a bottom of said main body part.

11. The ear mike phone as claimed in claim 1, wherein a cable securing device with a contacted part is installed between said main body part and said cable.

12. The ear mike phone as claimed in claim 1, wherein said cable securing device is shaped like a bellows.

* * * * *